United States Patent [19]

Delfrate

[11] 3,771,071

[45] Nov. 6, 1973

[54] ADJUSTABLE EQUALIZER FOR WIDE-BAND TRANSMISSION SYSTEM

[75] Inventor: Egidio Alvazzi Delfrate, Milan, Italy

[73] Assignee: Societa Italiana Telecomunicazioni, Milan, Italy

[22] Filed: Apr. 17, 1972

[21] Appl. No.: 244,719

[30] Foreign Application Priority Data

Apr. 15, 1971 Italy .............................. 23215 A/71

[52] U.S. Cl. .............................. 333/28 R, 333/70 R

[51] Int. Cl. .............................. H03h 7/14, H04b 3/04

[58] Field of Search .................. 333/28 R, 70 R, 18; 330/126

[56] References Cited

UNITED STATES PATENTS

| | | | |
|---|---|---|---|
| 3,458,816 | 7/1969 | O'Brien | 333/70 R X |
| 2,716,733 | 8/1955 | Roark | 333/28 R X |
| 2,907,838 | 10/1959 | Ross | 333/28 R UX |

OTHER PUBLICATIONS

Goodell, J. D. et al., Auditory Perception, Electronics, July 1946, p. 142, 143 relied on.

*Primary Examiner*—Paul L. Gensler
*Attorney*—Karl F. Ross

[57] ABSTRACT

An equalizer for a system transmitting a wide band of frequencies comprises a multiplicity of networks connected in parallel between a first coupler of low output impedance and a second coupler of low input impedance, one of these networks being of the all-pass type while the others are adjustably tuned to give passage to respective sub-bands centered on substantially equispaced frequencies between adjoining transmission channels. Each of the adjustable networks comprises a band-pass filter, including the primary winding of an internal transformer, and a polarity-inverting voltage divider.

9 Claims, 6 Drawing Figures

ADJUSTABLE EQUALIZER FOR WIDE-BAND TRANSMISSION SYSTEM

Figure 1:
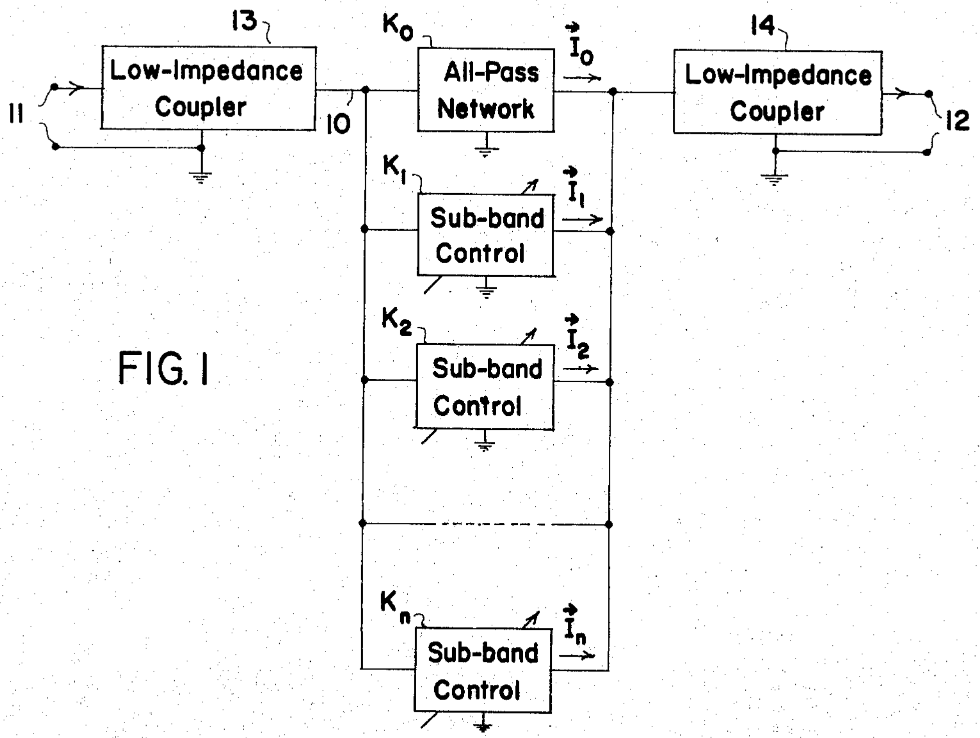

My present invention relates to an equalizer for a wide-band signaling system, e.g., a system for the transmission of a multiplicity of voice channels on respective carriers by way of a coaxial cable.

The prior art knows a variety of equalizers designed to compensate for distortions introduced in different regions of the overall band. These conventional equalizers, however, are relatively complex and correspondingly expensive.

The general object of my present invention, therefore, is to provide an improved, simplified equalizer designed to satisfy widely varying requirements.

A more specific object is to provide an equalizer whose basic constituents operate virtually independently in different ranges of the band so that an adjustment of any such constituent does not affect the setting of the others or appreciably alter the attenuation or phase of the frequencies controlled by them.

These objects are realized, pursuant to my present invention, by the provision of a number of networks connected in parallel between a first and a second coupler in a signal-transmission path, these networks including an all-pass network and a multiplicity of individually adjustable control networks each tuned to a different midfrequency within the overall band so as to give variable passage to currents in a series of adjoining sub-bands respectively centered on that midfrequency.

The first coupler, upstream of the parallel-connected networks, should have a very low output impedance so as to act as a current source substantially unaffected by any variation in he resistance of the several branch paths paralleling the all-pass network; similarly, the second coupler on the downstream side of the network should have a very low input impedance to act as a complementary current sink.

According to a more specific feature of my invention, each network comprises one or more voltage dividers (e.g., potentiometers) for the stepwise or continuous adjustment of the effective series resistance of the network and therefore of the compensatory currents passing therethrough; these currents are limited to the assigned sub-band by a frequency-selective pad such as a band-pass filter in cascade with the voltage divider so that the setting of the latter has no appreciable effect upon current of other frequencies in the equalizer output. Advantageously, the band-pass filter is essentially a parallel-resonant circuit tuned to the respective midfrequency, this circuit including a capacitance in shunt with an inductance which preferably is constituted by a primary winding of an internal coupling transformer. Polarity-inverting circuitry such as a reversing switch associated with the voltage divider enables selection not only of the magntidue but also of the sign of the compensating current traversing any of the control networks, i.e., a shifting of its phase by 180° relative to the corresponding component in the output of the all-pass network.

In a multichannel carrier-transmission system, the selected midfrequencies advantageously are so-called intersti-tial frequencies lying in the zones between adjoining first frequency spaced channels or channel groups. If one of the control networks should fail for any reason, networks controlling adjoining sub-bands could be returned to encompass the uncontrolled frequency range.

Figure 3:
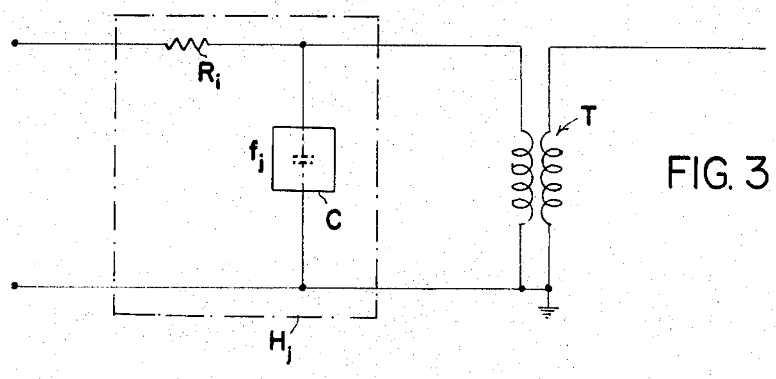

The invention will be described in greater detail hereinafter with reference to the accompanying drawing in which:

FIG. 1 is an overall block diagram of an equalizer embodying my invention;

FIGS. 2*a*, 2*b*, 2*c* and 2*d* show different embodiments of control networks used in the system of FIG. 1; and FIG. 3 illustrates in greater detail a frequency selective circuit included in the networks of FIGS. 2*a* – 2*d*.

The system shown in FIG. 1 comprises a transmission path 10 extending between a pair of input terminals 11 and a pair of output terminals 12. A first low-impedance coupler 13, energized with a wide band of incoming signal frequencies, works into a large number of networks $K_0$, $K_1$, $K_2$ . . . $K_n$ connected in parallel between that coupler and a similar low-impedance coupler 14. Couplers 13 and 14 are four-terminal networks with a near-zero output impedance and a near-zero input impedance, respectively, thereby effectively decoupling the intervening networks $K_0 - K_n$ from one another. Network $K_0$ is of the all-pass type having a constant transadmittance throughout the overall band; its output current $\vec{I_0}$ encompasses all the frequencies transmitted within that band. Networks $K_1$, $K_2$ . . . $K_n$ pass currents $\vec{I_1}$, $\vec{I_2}$ . . . $\vec{I_n}$ in relatively narrow sub-bands which may be centered on the interstitial frequencies between adjacent channels; each of these latter networks is independently adjustable to enable variation of the magnitude and/or the sign of its output current compensating for excessive or insufficient attenuation of the corresponding component of $\vec{I_0}$.

Figure 2A:
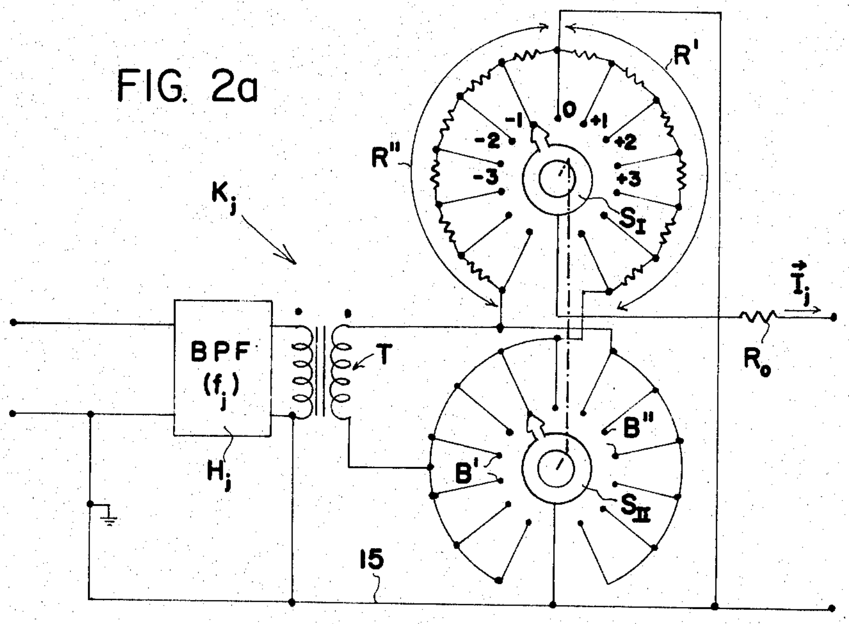

FIG. 2*a* shows a control network $K_j$ generically representing any of the networks $K_1 - K_n$ of FIG. 1. This network comprises a frequency-selective circuit $H_j$, i.e., a band-pass filter centered on a midfrequency $f_j$, coupled through a transformer T to a manually settable control cirucit including a pair of resistance chains R', R'' and a two-level rotary switch $S_I$, $S_{II}$ whose first wiper $S_I$ coacts with bank contacts (designated +1, +2, +3 . . . and −1, −2, −3 . . . ) tied to respective junctions of the two resistance chains; wiper $S_{II}$ sweeps two series of interconnected bank contacts B' and B'' respectively tied to resistances R' and R''. In the illustrated switch position, with wiper $S_I$ standing on bank contact −1, the current $\vec{I_j}$ passing through an outlet resisjor $R_o$ in series with the voltage divider R' r'' is sharply attenuated so that its corrective effect upon the output of the equalizer, after vectorial addition to current $\vec{I_0}$ in coupler 14, is relatively small; in a specific instance it may be assumed that this vectorial addition corresponds to a negative damping factor of −0.3 dB, i.e., a slight intensification of this particular current component. On the conjugate bank contact +1 the attenuation factor would be +0.3dB; on bank contacts +2 and −2 it would be ± 0.6dB, and so forth. If the currents traversing the transformer T are not in phase with the corresponding current components in the output of network $K_0$, a phase shift of $\phi$ or $\phi+\pi$ would be introduced, depending on the witch position. With switch arm $S_I$ standing on a central bank contact 0, output resistor $R_o$ is directly connected to a grounded bus bar 15 so that current $\vec{I_j}$ vanishes. Bank contacts B' and B'' may, of course, be replaced by continuous arc segments.

Figure 2B:
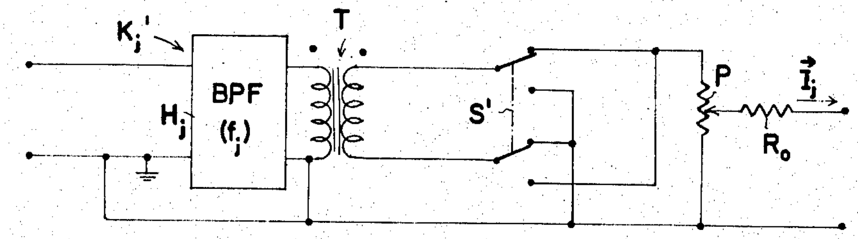

FIG. 2*b* shows a modified control network $K_j'$ wherein the switch $S_I$, $S_{II}$ has been replaced by a double-pole double-throw switch S' reversibly connecting the secondary of transformer T across a potentiometer P. The magnitude of output current $\vec{I_j}$ is thus continuously adjustable with the aid of the potentiometer P' whereas its polarity can be selected by means of reversing switch S'.

Figure 2C:
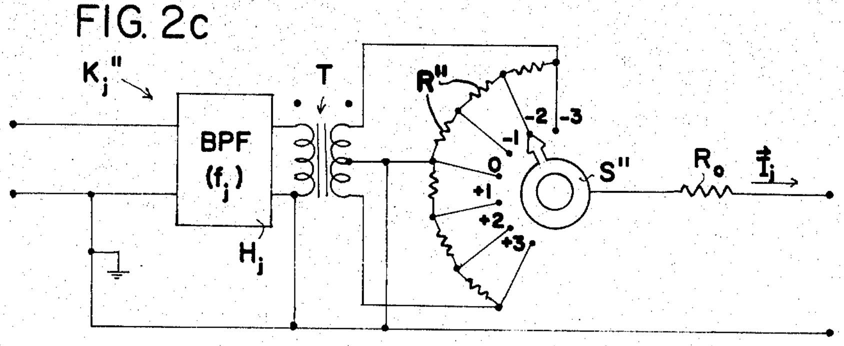

Another control network $K_j''$, shown in FIG. 2*c*, combines certain features of the preceding two Figures by having a resistance chain R'' connected across the secondary of the transformer T, coacting with a single-level rotary switch S'' whose wiper arm is engageable with any of several bank contacts labeled +3, +2, +1, 0, −1, −2, −3.

Figure 2D:
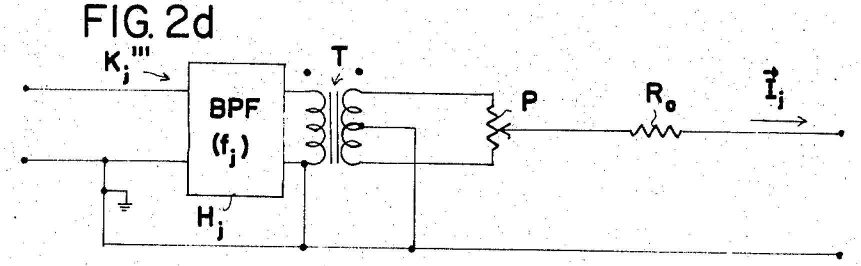

According to FIG. 2*d*, a network $K_j'''$ operates in essentially the same manner as network $K_j''$ of FIG. 2*c*, except that resistance chain R'' has been replaced by potentiometer P so that its adjustability is continuous rather than in steps.

A representative embodiment of frequency-selective netowrk $H_j$ is illustrated in FIG. 3 as comprising an input resisjor $R_i$ followed by a shunt capacitor C. The latter resonates the primary of transformer T at the assigned midfrequency $f_j$ so that the shunt impedance of the network is substantially infinite at that frequency. Capacitance C may, of course, form part of a more elaborate band-pass filter having a definite cutoff frequency at the upper and lower limits of the assigned range. Resistors $R_i$ and $R_o$ serve as decoupling resistances.

Although, in first approximation, each of the networks $K_1$ – $K_n$ is assumed to control only its own sub-band centered on frequency $f_j$, a more precise analysis taking into account the residual effect upon the other sub-bands establishes a damping factor $\delta_x$, introduced by the equalizer for any given frequency $f_x$, as $\delta_x = q_{x1} \cdot W_1 + q_{x2} \cdot W_2 + \ldots q_{xn} \cdot W_n$ where $q_{x1}$ etc. denoted the individual (positive or negative) attenuation imposed by that network upon frequency $f_x$ and where $W_1$, etc., is a measure of the setting of the corresponding control knob, e.g., as expressed in the number of steps taken from position 0 by the rotary switch of FIG. 2*a* or 2*c*. From this relationship, expressed in matrix form for *n* different frequencies $f_x$ such as the midfrequencies of the several control networks, it is readily possible to compute the setting of all the control knobs required to bring about a desired correction pattern for the entire band.

The system herein disclosed is particularly suitable for the adjustment of multichannel telecommunication facilities to seasonal variations of transmission characteristics. In a practical realization, up to 2,700 channels could be accommodated.

I claim:

1. An equalizer for a wide band of frequencies divided into a series of adjoining sub-bands and transmitted along a signal path, said sub-bands being centered on respective midfrequencies lying between a multiplicity of frequency-spaced communicating channels, comprising a first coupler in said path, a second coupler in said path downstream of said first coupler, an all-pass network inserted between said couplers, and a multiplicity of individually adjustable control networks connected in parallel with said all-pass network, said control networks being respectively tuned to the corresponding midfrequencies for giving variable passage to currents in any frequency in said adjoining sub-bands, said first coupler being a four-terminal network of near-zero output impedance and said second coupler being a four-terminal network of near-zero input impedance.

2. An equalizer as defined in claim 2 wherein each of said control networks comprises voltage-divider means for varying the magnitudes of the currents passed thereby and polarity-inverting circuitry for selectively shifting the phase of the passed currents by 180°.

3. An equalizer as defined in claim 2 wherein each of said control networks includes a frequency-selective circuit, tuned to the respective midfrequency, in cascade with said voltage-divider means.

4. An equalizer as defined in claim 3 wherein each of said control networks includes a coupling transformer between said frequency-selective circuit and said voltage-divider means.

5. An equalizer as defined in claim 4 wherein said frequency-selective circuit comprises a shunt capacitance resonating a primary winding of said transformer at the respective midfrequency.

6. An equalizer as defined in claim 5 wherein said frequency-selective circuit comprises a series input resistor ahead of said shunt capacitance.

7. An equalizer as defined in claim 4 wherein said voltage-divider means is connected across a secondary winding of said coupling transformer and is provided with a contact movable between points of zero and maximum voltage.

8. An equalizer as defined in claim 7 wherein said contact forms part of said polarity-inverting circuitry.

9. An equalizer as defined in claim 7, further comprising an output resistor in each control network connected to said contact.

* * * * *

PO-1050
(5/69)

UNITED STATES PATENT OFFICE
CERTIFICATE OF CORRECTION

Patent No. 3,771,071 Dated 6 November 1973

Inventor(s) Egidio Alvazzi DELFRATE

It is certified that error appears in the above-identified patent and that said Letters Patent are hereby corrected as shown below:

In the heading, line [73], for the designation of the assignee read:

-- SOCIETA' ITALIANA TELECOMUNICAZIONI SIEMENS s.p.a. --

Signed and sealed this 23rd day of April 1974.

(SEAL)
Attest:

EDWARD M. FLETCHER, JR.
Attesting Officer

C. MARSHALL DANN
Commissioner of Patents